United States Patent [19]

Anderson, IV

[11] Patent Number: 5,324,152

[45] Date of Patent: Jun. 28, 1994

[54] LOCKABLE SPRING CLIP II

[76] Inventor: Edmund T. Anderson, IV, 2521 Humble, Midland, Tex. 79705

[21] Appl. No.: 67,044

[22] Filed: May 25, 1993

[51] Int. Cl.$^5$ ............................................. F16B 21/14
[52] U.S. Cl. .................................. 411/530; 411/514; 411/351; 267/182
[58] Field of Search .............. 267/158, 182; 411/513, 411/514, 515, 516, 519, 522, 530, 340, 341, 342, 343, 351, 352, 910

[56] References Cited

U.S. PATENT DOCUMENTS

| 2,077,825 | 4/1937 | Davidson | 411/340 |
| 4,298,299 | 11/1981 | Quarles | 411/514 |
| 4,592,689 | 6/1986 | Leitzke | 411/530 X |
| 5,217,338 | 6/1993 | Czubek | 411/514 X |

FOREIGN PATENT DOCUMENTS 123461  2/1919  United Kingdom ................ 411/514

Primary Examiner—Douglas C. Butler
Assistant Examiner—Kevin D. Rutherford

[57] ABSTRACT

A lightweight, easy to fashion, easy to use, lockable spring clip to hold or retain any pin, hinge or body with drilled holes regardless of the location of the holes or shape of the body. Of one piece construction, utilizing a two stage locking procedure, but requiring no tools or special knowledge, this lockable spring clip offers strength, reliability, reusability and versatility not previously available.

7 Claims, 5 Drawing Sheets

LOCKABLE SPRING CLIP II

RELATED APPLICATIONS

This application is related to application Ser. No. 07/935/255 filed Aug. 27, 1992 now abandoned, by this inventor, which Application related to a Lockable Spring Clip, hereinafter referred to as: "Clip I."

BRIEF SUMMARY OF THE INVENTION

Clip I was designed to obviate the problems encountered with spring clips available at the time. Among these problems were accidental removal by brush, structural failure due to vibration, and accidental or purposeful removal by children. Said Application for Clip I is in condition for allowance except for formal matters which are in the process of being corrected. While Clip I successfully accomplished its purposes, testing and use revealed two areas that needed improvement: one, Clip I was difficult to open and close, and two, Clip I had a failure point of about 130 pounds for a 0.125" diameter, ⅜ hard spring wire, that is Clip I could be pulled out of a hitch pin when a force of approximately 130 pounds was applied to Clip I while in its "in use" position. Clip II, a redesign of Clip I, improves both of these areas.

DETAILED DESCRIPTION

In the description that follows, the figures and numerals used below refer to the Figures and Numerals in the accompanying drawings.

Figure 1:
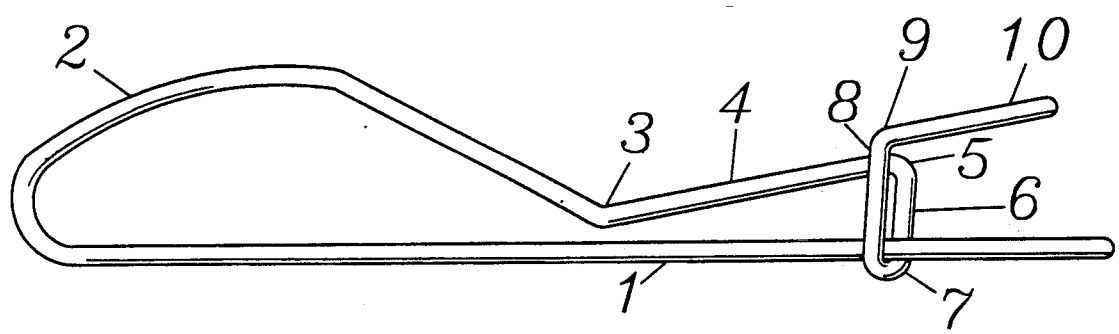
FIG. 1 is a view of one side of Clip II.

FIG. 1 shows Lockable Spring Clip II (Clip II) which is the subject of this application. Clip II is designed to hold a retaining pin, retained body, hitch pin 11 (FIGS. 2, 3 and 4) or any object with drilled holes in place, or to be used in devices which rely solely on spring clips. Clip II is a redesign of the device which is the subject of patent application Ser. No. 07/935/255; this prior device, invented by this inventor, is called a Lockable Spring Clip, and is herein referred to as Clip I. Testing and use of Clip I by this inventor showed two areas which needed improvement: one, Clip I was difficult to lock and unlock because fourth straight section 8, (FIG. 1) and 9 (FIG. 5), this application, ended abruptly at the second end before the beginning of fifth arc 9 (FIG. 1) and 10 (FIG. 5), this application, leaving only a small end surface against which leverage was applied by the thumb or fore-finger in lifting first straight section 1 up and over fourth straight section 8; and, two, the applied force necessary to remove Clip I from the "in-use" and locked position as in the case of a failure was less than projected.

Although there was no danger involved in the locking and unlocking motion of Clip I, there was discomfort to the thumb and/or fingers in such motions in the larger diameter Clip I's. It was anticipated that older persons and some women might have difficulty installing and removing Clip I. The addition of fifth arc 9 and fifth straight section 10, together with the lengthening of first straight section 1 now provide adequate comfort and surface area for the thumb and fingers during the locking and unlocking motion described later.

Regarding two, the spring clips tested by the inventor, which clips are currently available on the market, failed at less than 10 pounds of removal force; that is such clips pulled free of their "in-use" position when less than 10 pounds of force was applied in the opposite direction of their insertion into a hitch pin. Clip I demonstrated more than a ten fold increase in security despite the fact that the diameter of Clip I was smaller than the diameter of the other clips tested. Clip I failed when approximately 130 pounds of force was applied in the opposite direction of insertion into hitch pin 11. Noting the manner in which Clip I failed, the inventor felt that greater security could be had with slight redesign. Clip I failed in an unexpected manner; referring to FIG. 1, application Ser. No. 07/935/255, first straight section 1 bowed and pulled free from arc 5. Such failure demonstrated that forces causing failure were being applied against the section most subject to deformation, first straight section 1. With slight redesign, most of the force causing failure was redirected toward arc 5, this application, increasing the resistance to failure to more than 240 pounds using the same diameter wire as used in Clip I. Thus, this application.

Clip II, shown in FIG. 1, is made out of a single piece of wire or a rod, the length and diameter of which depend upon the application, with the hardness and springiness appropriate for retention of the shape of Clip II and the locking and unlocking process. The wire or rod, hereafter "wire", can be plain or plated to resist corrosion, so long as the memory, strength and springiness are retained.

Clip II can be made by a wire-bending machine, a handbender, or other suitable tools used in metal working. Referring to FIG. 1, Clip II is formed out of a piece of wire having first and second ends. From the first end, a first straight section is fashioned, ending at first arc 2. First arc 2 is formed of approximately 215° in one plane and curving back in the direction of the first end, with first arc 2 extending approximately 50% of the distance of the said first straight section 1. This first arc 2 is not circular in shape, but rather begins with a sharp curve of approximately 140°, straightening to accommodate the remaining arc of approximately 75°. The arc thus formed is one of fairly low relief to the first straight section, and thus resists deformation yet provides the springiness for resistance to movement for first straight section 1 in locking and unlocking. It is important that the low relief be maintained, for the resistance to failure increases dramatically when this first arc 2 lies fairly close to the first straight section.

Following the first arc is a second arc 3 of approximately 45° lying on the same plane as first arc 2 with the direction of second arc 3 being away from first straight section 1. Second arc 3 lies fairly close to, but does not touch first straight section 1; the purpose of this gap is to allow a hitch pin or retained body to pass between first straight section 1 and second arc 3, but close enough to provide resistance to this movement. Second arc 2 provides the surface to which resistance to movement of the hitch pin or the retained body is applied. The actual resistance to movement of the retained pin or body is supplied by the springiness of the wire, and first straight section 1 coming in contact with fourth arc 7. As a retained body is moved from inside first arc 2 to the space between first straight section 1 and second straight section 4, and vice versa, the retained body separates first straight section 1 from second arc 2, and in doing so causes first straight section 1 to contact the interior of fourth arc 7. Resisting deformation, first straight section 1 must bend slightly as the retained pin passes. This forces the retained pin to be squeezed between first straight section 1 and second arc 3, increasing the resistance to movement of the retained pin. This helps insure the retained pin stays between first straight section 1 and second straight section 4, the most secure position.

Second arc 3 is followed by second straight section 4, which 4 is on the same plane as first arc 2 and is approximately 33% of the length of first straight section 1. Second straight section 4 angles away from first straight section 1 at an angle of approximately 6°, but such angle could be adjusted to match the radius of the retained body. The retained body may fit snugly or loosely between straight sections 1 and 4, as long as there is resistance to movement of such body toward the space created by first arc 2, and as long as the retained body binds between straight sections 1 and 4 and prevents straight section 1 from moving up and over the top of the locking post comprised of sections 8, 9 and 10.

Second straight section 4 is followed by third arc 5 of approximately 105°. This third arc 5 is fairly tight, being of sufficient length to accommodate the said 105° turn without damage to the wire. The direction of this third arc is toward first straight section 1 and on the same plane as first arc 2, and is followed by a third straight section 6. The length of third straight section 6 is approximately 10% of the length of first straight section 1. The purpose of third arc 5 and third straight section 6 is to form a barrier against which the retained body rests. Stress tests indicate that much of the strength of Clip II lies in third arc 5 and third straight section 6; therefore, care must be taken in forming third arc 5 so that the strength of Clip II remains intact. The third straight section 6 passes on the back side of first straight section 1 as shown in FIG. 1. The length of this third straight section 6 is fairly critical. If the length is too short, movement of the retained body between the space created by first arc 2 and the space between first straight section 1 and third straight section 4 will be too difficult; if the length is too long, there is very little resistance to the movement of the retained body, and safety is compromised.

A fourth arc 7 follows third straight section 6, with the inside diameter of this arc being at least the size of the outside diameter of the wire, but no more than 1.1× the outside diameter of the wire, with the angle of this fourth arc 7 being 180°, and the direction being at a dihedral angle perpendicular to first straight section 1, passing under and around first straight section 1 as shown in FIG. 1.

Fourth arc 7 is followed by a fourth straight section 8, the length of which is approximately 20% of the length of first straight section 1. Fourth straight section 8 runs parallel to third straight section 6, and passes on the outside of first straight section 1 as shown in FIG. 1. The combination of third straight section 6, fourth arc 7 and fourth straight section 8 forms a cradle within which resides first straight section 1 when Clip II is in a locked position, as in FIGS. 1, 3 and 4. This cradle locks first straight section 1 in place in two ways: one, it prevents first straight section 1 from unlocking when force is applied to first straight section 1 in a direction away from first arc 2 and second straight section 4, i.e., a downward motion in FIG. 1; and two, it prevents first straight section 1 from unlocking when force is applied in the direction of third arc 5 when the retained body is in place between first straight section 1 and second straight section 4, i.e., in an upward motion in FIG. 1. In this second case, the retained body binds first straight section 1, and movement is impossible without deformation of first straight section 1. The length of fourth straight section 8 is critical. If it is too long, unlocking can be a chore; if it is too short, first straight section 1 can be lifted up and over fourth straight section 8, fifth arc 9 and fifth straight section 10 when the retained body is inside the space between first straight section 1 and second straight section 4, thus defeating the security of Clip II.

Fifth arc 9 follows fourth straight section 8, and is an arc of approximately 70°, the direction of which is away from first arc 2 and on a plane parallel to the plane of first arc 2, said planes being separated by the inside diameter of fourth arc 7. The length of this fifth arc 9 is only long enough to accommodate the arc.

Fifth straight section 10 follows fifth arc 9, and is on the same plane as fourth straight section 8 and fifth arc 9. The length of fifth straight section 10 is approximately 12.5% of the length of first straight section 1, and ends at the second end; this length may be shorter, as its purpose is to provide a platform against which leverage may be applied by the thumb or forefinger in locking and unlocking Clip II. It is important that fifth straight section 10 not be parallel to first straight section 1, but rather lie at approximately a 20° angle to straight section 1 as shown in FIG. 1, otherwise the thumb or forefinger may slip off of fifth straight section 10 during locking and unlocking.

Figure 2:
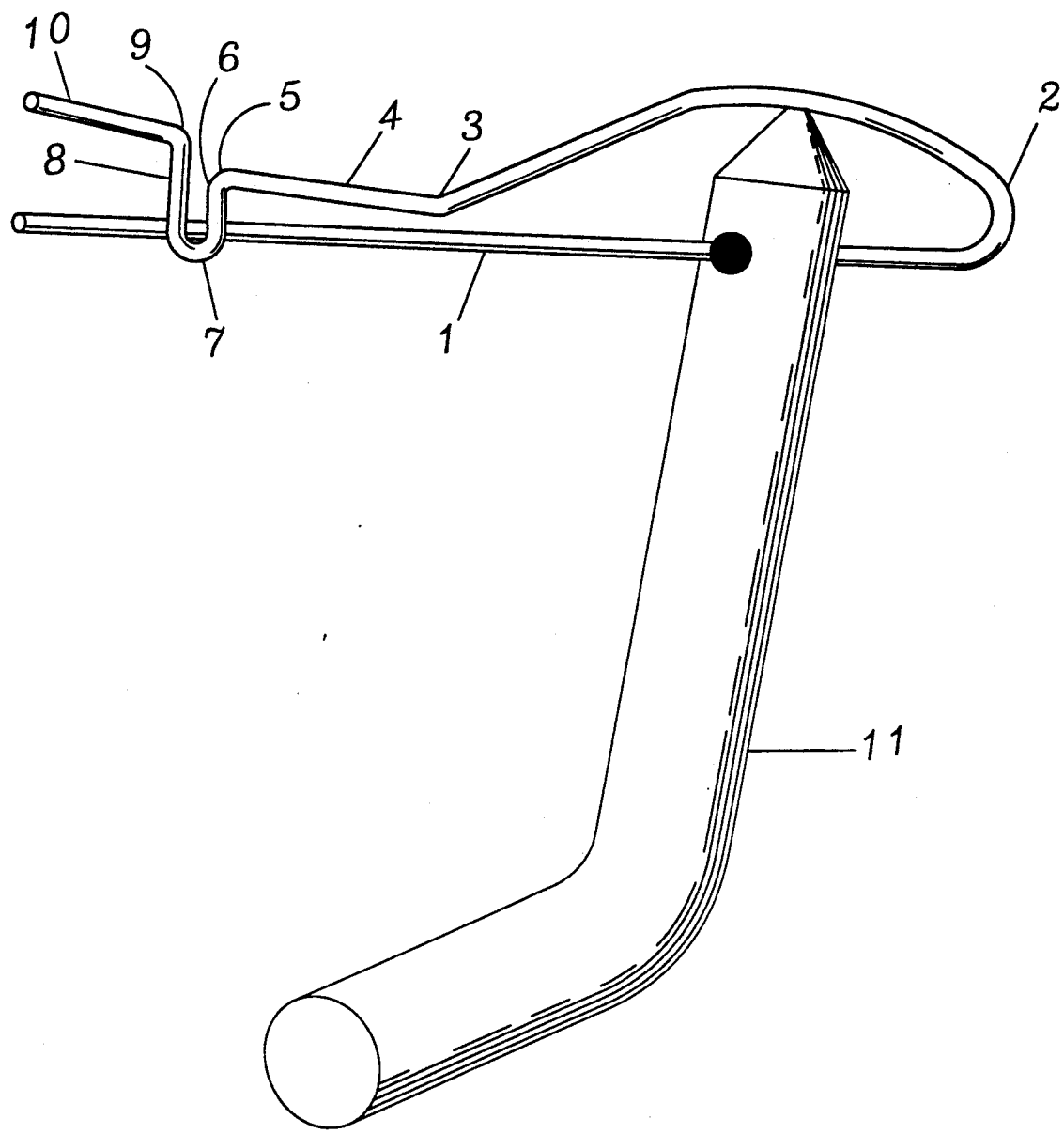
FIG. 2 is a view from the other side, after insertion into a hitch pin, with the first and second ends facing the viewer at about a 45° angle.
Figure 3:
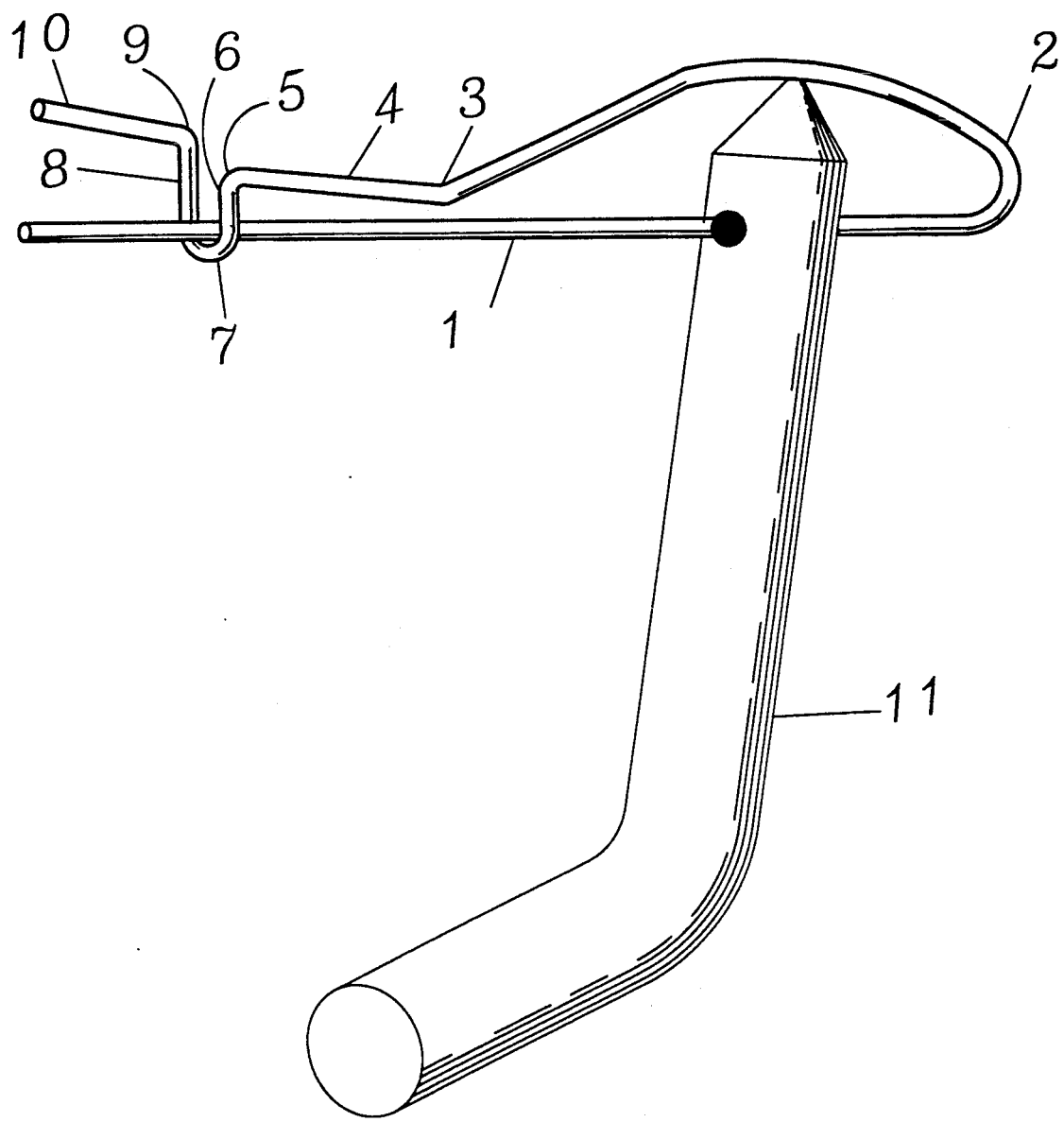
FIG. 3 is the same view of FIG. 2, except that Clip II has been locked; the hitch pin has not yet been placed in the "in-use" position.

To use, first straight section 1 is inserted into a hitch pin, retaining pin, or retained body, and is pushed into the pin or body until the pin or body is located inside first arc 2, as shown in FIG. 2. Clip II is then locked by first lifting first straight section 1 over the top of fourth straight section 8, fifth arc 9 and fifth straight section 10, as shown in FIG. 3, then Clip II is pulled by the user's finger, which finger is placed inside first arc 2, until the pin or body rests between first straight section 1 and second straight section 4. It is easiest to accomplish the locking and unlocking motion by squeezing first straight section 1 toward fifth straight section 10 with the thumb and forefinger, and when these two sections 1 and 10 touch, simply rotate first straight section 1 over fifth straight section 10 by rotating the hand in the desired direction. Unlocking and removal are accomplished by reversing the above steps.

Figure 4:
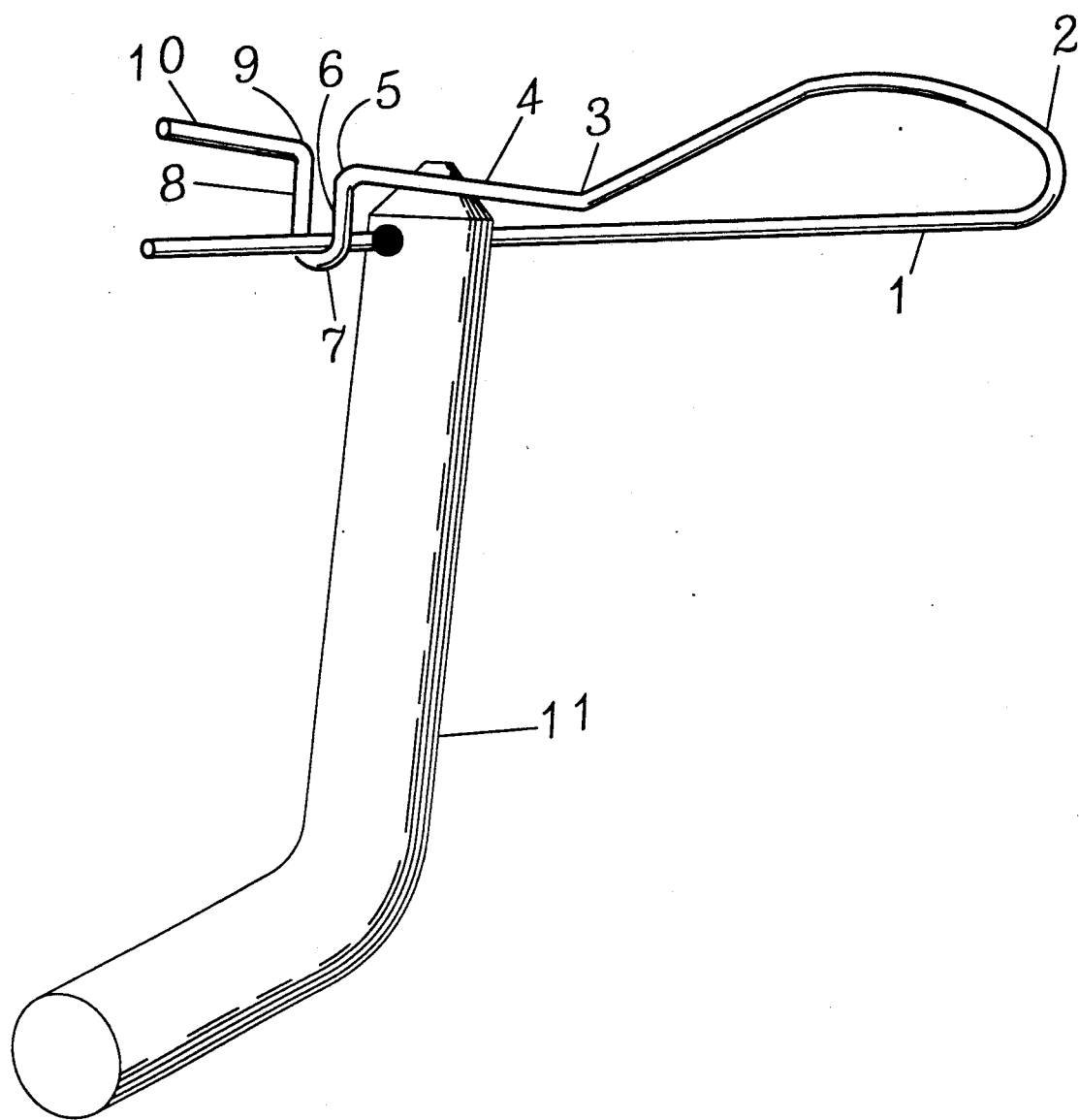
FIG. 4 is the same view as FIGS. 2 and 3, but the hitch pin has been placed in the "in-use" position.

Once locked in the "in-use" position, FIG. 4, Clip II cannot be removed accidentally without the use of great force. Upward travel of first straight section 1 is limited by the pin or body, in that first straight section 1 cannot be lifted up and over fifth straight section 10 because the pin or body binds against second straight section 4, and since first straight section 1 is inside the pin or body, first straight section 1 is bound also. Resistance to being pulled out of a pin or body in the opposite direction of insertion was tested to be greater than 240 pounds for a 0.125 diameter, ⅜ hard spring wire. Such resistance will vary with the characteristics of the wire, but Clip II offers a tremendous improvement over other spring clips tested. Movement of Clip II such that the pin or body comes to rest inside first arc 2, see FIG. 3, leaves Clip II in a locked position with first straight section 1 still inside the pin or body. While FIG. 3 is not the ideal position, Clip II will still be in place, and the pin or body retained; FIG. 3 serves as a fail-safe.

Like Clip I, Clip II can be placed anywhere on a pin or body that has a drilled shaft, and Clip II is lockable anywhere on that pin or body, whether the drilled shaft is perpendicular to the pin or body, or drilled at an angle to the pin or body. Also like Clip I, Clip II does not have to fit perfectly on the retained pin or body, that is, the diameter of the pin or body does not have to correspond exactly to the distance between first straight section 1 and second straight section 4, so long as there is resistance to the movement of the pin or body from first arc 2 to the space between first straight section 1 and second straight section 4, and vice versa, by the action of first straight section 1 contacting fourth arc 7. Unlike Clip I, however, Clip II is much easier to lock and unlock due to the addition of fifth straight section 10 and its connecting fifth arc 9.

The big difference between Clip I and Clip II is the resistance to failure. Clip II shifts the stress caused by being pulled in the opposite direction of insertion to third arc 5 and third straight section 6, and in so doing nearly doubles the strength of Clip II. Unlike Clip I, Clip II shifts the forces causing failure to the area that offers the most resistance to failure.

Figure 5:
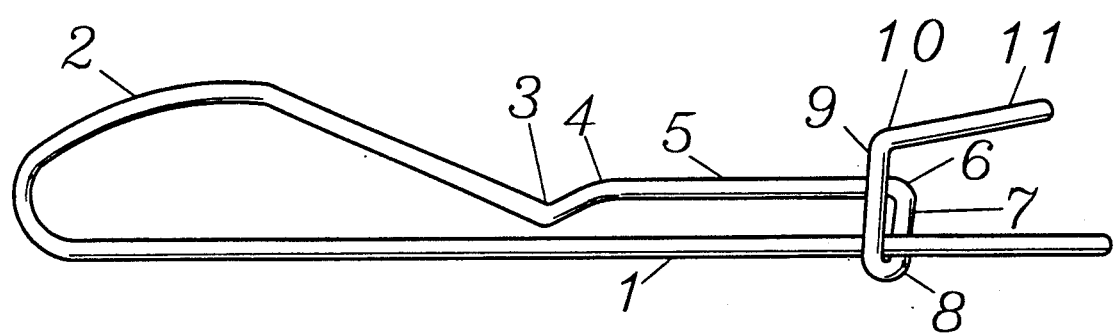
FIG. 5 is a variation of Clip II.

FIG. 5 shows a variation of Clip II. This design may be used as a removable hinge pin, or in place of a dowel used as a retaining pin. In this application, first straight section 1 is made parallel to second straight section 5 in order to accommodate a longer section of material which is to be held in place. This change in design is accomplished by beginning with first straight section 1 and first arc 2 as is identical with Clip II. However, for this version, second arc 3, which follows first arc 2, is increased to approximately 70° in a tight arc, and followed immediately by a third arc 4 of approximately 35°. The direction of second arc 3 is away from first straight section 1 and on the same plane as first arc 2. Third arc 4 is in the direction of the first end, and is on the same plane as first arc 2. Second straight section 5 follows third arc 4, and is approximately 25% of the length of first straight section 1, but could be shorter or longer as required. Fourth arc 6 follows second straight section 5, and is an arc of approximately 100°, the direction of which is toward first straight section 1, and on the same plane as first arc 2, connecting to third straight section 7 which passes on the back side of first straight section 1 as shown in FIG. 5, and is approximately 10% of the length of first straight section 1. Fifth arc 8 follows third straight section 7, with the inside diameter of this arc being at least the size of the outside diameter of the wire, but no more than 1.1× said diameter, with the angle of this fifth arc being 180°, and the direction being at a dihedral angle perpendicular to first straight section 1, passing under and around first straight section 1 as shown in FIG. 5. Fourth straight section 9 follows fifth arc 8, and is approximately 20% of the length of first straight section 1, parallel to third straight section 7 and passing on the outside of first straight section 1 as shown in FIG. 5. Sixth arc 10 follows fourth straight section 9, and is an arc of approximately 70°, the direction of which is away from first arc 2 and on a plane parallel to the plane of first arc 2, said planes being separated by the inside diameter of fifth arc 8. Fifth straight section 11 follows sixth arc 10, and is on the same plane as fourth straight section 9 and sixth arc 10, and is approximately 12.5% of the length of first straight section 1 and ends at the second end. The construction and use of this variation are the same as for Clip II, FIG. 1.

With Clip II and the variation, FIG. 5, it should be noted that the plane of first arc 2 does not lie in exactly the same plane as that of first straight section 1, but rather at a slight dihedral angle to first straight section 1. This is to accommodate the position of first straight section 1 being next to the third straight section 6 (FIG. 1) and 7 (FIG. 5) when Clip II is in a locked position, FIGS. 1, 3, 4 and 5. It is not necessary to provide for this divergence in forming Clip II, as the natural springiness of the wire will accommodate the dihedral, except in the case of very large diameter wires, in which case the dihedral should be formed at the end of first section 1 and beginning of first arc 2.

With the variation of Clip II, FIG. 5, first straight section 1 is equidistant from second straight section 5, but is not parallel to it in three dimentions because of the slight divergence of their planes, as discussed immediately above.

With both Clip II and its variation, the narrowness of the cradle formed by 6, 7 and 8 (FIG. 1) and 7, 8 and 9 (FIG. 5) are controlled by the inside diameter of fourth arc 7 (FIG. 1) and fifth arc 8 (FIG. 5). It is important that these inside diameters be kept small so that the retained body binds and limits the movement of first straight section 1 to the maximum extent. If the arc is too wide it would be possible to unlock Clip II from its "in-use" position, FIG. 4; therefore, the inside diameter should only be large enough to permit the locking and unlocking motion previously described, that is, the same diameter of the wire, and no greater than 1.1× the said diameter.

I claim:

1. A lockable spring clip for retaining and holding an object with drilled holes, the lockable spring clip being made from a metal rod or wire with first and second ends with a first straight section, wherein the spring clip comprises:

a. a first arc of approximately 215° curving back toward the first end approximately 50% of the length of the first straight section, beginning with a sharp curve of approximately 140°, straightening to accommodate the remaining arc of approximately 75°, with the plane of this arc being slightly dihedral to the plane of the first straight section, diverging only enough to accommodate the relationship of the first straight section lying next to the third straight section when locked, and b. a second arc of approximately 45° in the same plane as the first arc, coming within less than one diameter of, but curving away from, the first straight section, said diameter being the diameter of the wire or rod used, and c. a second straight section following the second arc, on the same plane as the first arc and approximately 33% of the length of the first straight section, diverging from the first straight section at an angle of approximately 6° to fit the diameter of the retained body, and d. a third arc of approximately 105° following the second straight section, this third arc being in the direction of the first straight section and on a plane with the first arc, and e. a third straight section following the third arc, with the third straight section being approximately 10% of the length of the first straight section, in the direction of and passing on one side of the first straight section in the same plane as the first arc, and f. a fourth arc following the third straight section, with the inside diameter of this fourth arc being at least the size of the outside diameter of the wire or rod, but no more than 1.1×the outside diameter of the wire or rod, with the angle of this fourth arc being 180°, and the direction being at a dihedral angle perpendicular to the first straight section, passing under and around the first straight section, and g. a fourth straight section following the fourth arc, with the length of this fourth straight section being approximately 20% of the length of the first straight section, parallel to the third straight section, and passing on the side of the first straight section opposite from the third straight section, and h. a fifth arc following the fourth straight section of approximately 70°, the direction of which fifth arc is away from the first arc and on a plane parallel to the plane of the first arc, with the said planes being separated by the inside diameter of the fourth arc, and i. a fifth straight section following the fifth arc, with this fifth straight section on the same plane as the fourth straight section and fifth arc, with a length of approximately 12.5% of the length of the first straight section, and ending at the second end.

2. A lockable spring clip according to claim 1 wherein said spring clip may lie at any plane or angle to the axis of the retained body, at any position on said retained body.

3. A lockable spring clip according to claim 1, which retains its locked character even when dislodged from the in-use position, that is, from the position wherein the retained body rests between the first straight section and the second straight section.

4. A lockable spring clip for retaining and holding an object with drilled holes, the lockable spring clip being made from a metal rod or wire with first and second ends with a first straight section, wherein the spring clip comprises:

a. a first arc of approximately 215° curving back toward the first end approximately 50% of the length of the first straight section, beginning with a sharp curve of approximately 140°, straightening to accommodate the remaining arc of approximately 75°, with the plane of this arc being slightly dihedral to the plane of the first straight section, diverging only enough to accommodate the relationship of the first straight section lying next to the third straight section when locked, and b. a second arc of approximately 45° in the same plane as the first arc, coming within less than one diameter of, but curving away from, the first straight section, said diameter being the diameter of the wire or rod used, and c. a second straight section following the second arc, on the same plane as the first arc and approximately 33% of the length of the first straight section, diverging from the first straight section at an angle of approximately 6° to fit the diameter of the retained body, and d. a third arc of approximately 105° following the second straight section, this third arc being in the direction of the first straight section and on a plane with the first arc, and e. a third straight section following the third arc, with the third straight section being approximately 10% of the length of the first straight section, in the direction of and passing on one side of the first straight section in the same plane as the first arc, and f. a fourth arc following the third straight section, with the inside diameter of this fourth arc being at least the size of the outside diameter of the wire or rod, but no more than 1.1×the outside diameter of the wire or rod, with the angle of this fourth arc being 180°, and the direction being at a dihedral angle perpendicular to the first straight section, passing under and around the first straight section, and g. a fourth straight section following the fourth arc, with the length of this fourth straight section being approximately 20% of the length of the first straight section, parallel to the third straight section, and passing on the side of the first straight section opposite from the third straight section, and h. a fifth arc following the fourth straight section of approximately 70°, the direction of which fifth arc is away from the first arc and on a plane parallel to the plane of the first arc, with the said planes being separated by the inside diameter of the fourth arc, and i. a fifth straight section following the fifth arc, with this fifth straight section on the same plane as the fourth straight section and fifth arc, with a length of approximately 12.5% of the length of the first straight section, and ending at the second end, and j. said lockable spring clip being locked in place by first removing the first straight section from its cradle comprised of the third straight section, the 180° fourth arc and the fourth straight section, then inserting the first straight section into the retained body at the first end, pushing the lockable spring clip into the retained body until the retained body rests inside the first arc, then returning the first straight section to its cradled position inside the third straight section, the 180° fourth arc and the fourth straight section, then pushing the retained body to a position inside the space between the first straight section and the second straight section.

5. A lockable spring clip for use as a removable hinge pin, or a retaining pin, this spring clip being made clip from a metal rod or wire with first and second ends with a first straight section, wherein the spring clip comprises:

a. a first arc of approximately 215° curving back toward the first end approximately 50% of the length of the first straight section, beginning with a sharp curve of approximately 140°, straightening to accommodate the remaining arc of approximately 75°, with the plane of this arc being slightly dihedral to the plane of the first straight section, diverging only enough to accommodate the relationship of the first straight section lying next to the third straight section when locked, and b. a second arc following the first arc of approximately 70°, in the same plane as the first arc, coming within less than one diameter of, but curving away from, the first straight section, said diameter being the diameter of the wire or rod used, and c. a third arc of approximately 35° following the second arc, on the same plane as the first arc and in the direction of the first end, and d. a second straight section following the third arc, approximately 25% of the length of the first straight section, parallel to the first straight section and in the same plane as the first arc, and e. a fourth arc following the second straight section, of approximately 100° in the direction of the first straight section and in the same plane as the first arc, and f. a third straight section following the fourth arc, with the third straight section being approximately 10% of the length of the first straight section, in the direction of and passing on one side of the first straight section in the same plane as the first arc, and g. a fifth arc following the third straight section, with the inside diameter of this fifth arc being at least the size of the outside diameter of the wire or rod, but no more than 1.1× the outside diameter of the wire or rod, with the angle of this fifth arc being 180°, and the direction being at a dihedral angle perpendicular to the first straight section, passing under and around the first straight section, and h. a fourth straight section following the fifth arc, with the length of this fourth straight section being approximately 20% of the length of the first straight section, parallel to the third straight section, and passing on the side of the first straight section opposite from the third straight section, and i. a sixth arc following the fourth straight section of approximately 70°, the direction of which sixth arc is away from the first arc and on a plane parallel to the plane of the first arc, with the said planes being separated by the inside diameter of the fifth arc, and j. a fifth straight section following the sixth arc, with this fifth straight section on the same plane as the fourth straight section and sixth arc, with a length of approximately 12.5% of the length of the first straight section, and ending at the second end.

6. A lockable spring clip according to claim 5, which retains its locked character even when dislodged from the in-use position, that is, from the position wherein the retained body rests between the first straight section and the second straight section.

7. A lockable spring clip for use as a removable hinge pin, or a retaining pin, this spring clip being made from a metal rod or wire with first and second ends with a first straight section, wherein the spring clip comprises:

a. a first arc of approximately 215° curving back toward the first end approximately 50% of the length of the first straight section, beginning with a sharp curve of approximately 140°, straightening to accommodate the remaining arc of approximately 75°, with the plane of this arc being slightly dihedral to the plane of the first straight section, diverging only enough to accommodate the relationship of the first straight section lying next to the third straight section when locked, and b. a second arc following the first arc of approximately 70°, in the same plane as the first arc, coming within less than one diameter of, but curving away from, the first straight section, said diameter being the diameter of the wire or rod used, and c. a third arc of approximately 35° following the second arc, on the same plane as the first arc and in the direction of the first end, and d. a second straight section following the third arc, approximately 25% of the length of the first straight section, parallel to the first straight section and in the same plane as the first arc, and e. a fourth arc following the second straight section, of approximately 100° in the direction of the first straight section and in the same plane as the first arc, and f. a third straight section following the fourth arc, with the third straight section being approximately 10% of the length of the first straight section, in the direction of and passing on one side of the first straight section in the same plane as the first arc, and g. a fifth arc following the third straight section, with the inside diameter of this fifth arc being at least the size of the outside diameter of the wire or rod, but no more than 1.1× the outside diameter of the wire or rod, with the angle of this fifth arc being 180°, and the direction being at a dihedral angle perpendicular to the first straight section, passing under and around the first straight section, and h. a fourth straight section following the fifth arc, with the length of this fourth straight section being approximately 20% of the length of the first straight section, parallel to the third straight section, and passing on the side of the first straight section opposite from the third straight section, and i. a sixth arc following the fourth straight section of approximately 70°, the direction of which sixth arc is away from the first arc and on a plane parallel to the plane of the first arc, with the said planes being separated by the inside diameter of the fifth arc, and j. a fifth straight section following the sixth arc, with this fifth straight section on the same plane as the fourth straight section and sixth arc, with a length of approximately 12.5% of the length of the first straight section, and ending at the second end, and k. said lockable spring clip being locked in place by first removing the first straight section from its cradle comprised of the third straight section, the 180° fifth arc and the fourth straight section, then inserting the first straight section into the retained body at the first end, pushing the lockable spring clip into the retained body until the retained body rests inside the first arc, then returning the first straight section to its cradled position inside the third straight section, the 180° fifth arc and the fourth straight section, then pushing the retained body to a position inside the space between the first straight section and the second straight section.

* * * * *